(12) United States Patent
Karpenman et al.

(10) Patent No.: US 10,239,404 B2
(45) Date of Patent: Mar. 26, 2019

(54) METHOD OF CONTROLLING A VEHICLE

(71) Applicant: VOLVO TRUCK CORPORATION, Göteborg (SE)

(72) Inventors: Fredrik Karpenman, Västra Frölunda (SE); Samuel Jakobsson, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 16 days.

(21) Appl. No.: 15/555,089

(22) PCT Filed: Mar. 3, 2015

(86) PCT No.: PCT/EP2015/054436
§ 371 (c)(1),
(2) Date: Sep. 1, 2017

(87) PCT Pub. No.: WO2016/138944
PCT Pub. Date: Sep. 9, 2016

(65) Prior Publication Data
US 2018/0050590 A1    Feb. 22, 2018

(51) Int. Cl.
*B60W 30/18* (2012.01)
*B60K 28/10* (2006.01)

(52) U.S. Cl.
CPC ....... *B60K 28/10* (2013.01); *B60W 30/18072* (2013.01); *B60W 2510/0638* (2013.01);
(Continued)

(58) Field of Classification Search
CPC ... B60W 30/18072; B60W 2510/0638; B60W 2510/0652; B60W 2710/021; B60K 28/10
See application file for complete search history.

(56) References Cited

U.S. PATENT DOCUMENTS

| 4,981,202 A * | 1/1991 | Leigh-Monstevens ..................... B60W 10/06 192/3.56 |
| 5,062,049 A | 10/1991 | Taylor |

(Continued)

FOREIGN PATENT DOCUMENTS

| DE | 10229035 A1 | 1/2004 |
| EP | 1035344 A2 | 9/2000 |

(Continued)

OTHER PUBLICATIONS

International Search Report (dated Dec. 1, 2015) for corresponding International App. PCT/EP2015/054436.

*Primary Examiner* — Edwin A Young
(74) *Attorney, Agent, or Firm* — WRB-IP LLP

(57) ABSTRACT

A method of controlling a vehicle presenting a plurality of wheels, an engine and a clutch for selectively connecting the engine to a number of the wheels includes receiving a torque control signal indicative of a demanded output torque of the engine, and observing a value of a first vehicle operation parameter being the vehicle speed or a parameter which is indicative of the vehicle speed, controlling the clutch so as to be engaged if the received torque control signal indicates that the demanded engine torque is minimal or below a first threshold value and the observed first vehicle operation parameter value is above a second threshold value, subsequently to the step of controlling the clutch so as to be engaged, performing a test disengagement of the clutch, including at least partly disengaging the clutch, observing a behavior, in response to the test disengagement, of a second vehicle operation parameter, and (Continued)

based at least partly on the observation of the behavior of the second vehicle operation parameter, determining whether to control the clutch so as to be re-engaged or disengaged.

15 Claims, 5 Drawing Sheets

(52) U.S. Cl.
CPC . *B60W 2510/0652* (2013.01); *B60W 2520/10* (2013.01); *B60W 2520/105* (2013.01); *B60W 2540/10* (2013.01); *B60W 2710/021* (2013.01)

(56) References Cited

U.S. PATENT DOCUMENTS

| | | | |
|---|---|---|---|
| 5,928,110 | A | 7/1999 | Vornehm et al. |
| 6,926,638 | B1 | 8/2005 | Gimmler et al. |
| 2003/0144110 | A1* | 7/2003 | Jung ............... F16D 48/06 477/80 |
| 2004/0166991 | A1* | 8/2004 | Buchanan ............ B60W 10/02 477/174 |
| 2009/0312929 | A1 | 12/2009 | Doebele et al. |
| 2011/0136620 | A1 | 6/2011 | Gibson et al. |
| 2013/0040778 | A1* | 2/2013 | Schulte ................. B60K 6/48 477/5 |

FOREIGN PATENT DOCUMENTS

| | | | |
|---|---|---|---|
| EP | 1177932 | A2 | 6/2002 |
| EP | 1630054 | A1 | 3/2006 |

\* cited by examiner

METHOD OF CONTROLLING A VEHICLE

BACKGROUND AND SUMMARY

The invention relates to a method of controlling a vehicle presenting a plurality of wheels, an engine and a clinch for selectively connecting the engine to a number of the wheels, the method comprising receiving a torque control signal indicative of a demanded output torque of the engine, and observing a value of a first vehicle operation parameter being the vehicle speed or a parameter which is indicative of the vehicle speed.

A vehicle moving without a driver being in full control of it may cause considerable damages, injuries and/or casualties, in particular if the vehicle is a heavy vehicle, such as a truck or a bus. Damages may be caused not only to persons and external objects, but also to the vehicle itself, e.g. by harmful speeds for the clutch disc and gearbox bearings etc. A situation with a stray vehicle can occur in a variety of circumstances. For example, the vehicle may be standing still in a downhill slope of a road, with the engine idling, but without a parking brake activated. If in such a situation the driver is not in control of the vehicle, the vehicle can on its own start rolling due to gravity and the inclination of the road. The reason for the driver's lack of control may be e.g. that he or she has quickly fallen ill and is incapable of controlling the vehicle, or that he or she is by negligence not giving the vehicle operation his or her required attention. The driver might even have left the vehicle.

Thus, there is a desire to provide a solution that would reduce the risk of damages, injuries and casualties in situations where a vehicle moving without a driver being in full control of it.

It is desirable to decrease the risk of damage or injury in situations where a driver is not in full control of a moving vehicle.

According to an aspect of the present invention, a method is provided of controlling a vehicle presenting a plurality of wheels, an engine and a clutch for selectively connecting the engine to a number of the wheels, the method comprising receiving a torque control signal indicative of a demanded output torque of the engine, and observing a value of a first vehicle operation parameter being the vehicle speed or a parameter which is indicative of the vehicle speed, characterised in
controlling the clutch so as to be engaged if the received torque control signal indicates that the demanded engine torque is minimal or below a first threshold value and the observed first vehicle operation parameter value is above a second threshold value,
subsequently to the step of controlling the clutch so as to be engaged, performing a test disengagement of the clutch, comprising at least partly disengaging the clutch,
observing a behaviour, in response to the test disengagement, of a second vehicle operation parameter, and
based at least partly on the observation of the behaviour of the second vehicle operation parameter, determining whether to control the clutch so as to be re-engaged or disengaged.

It is understood, as is known per se, that depending on the vehicle and driveline type, the engine can be connected to some of the wheels or all of the wheels, for example to two, four, or more wheels.

It is also understood that the torque control signal can be provided by a torque control device for controlling the engine output torque. The torque control device could be of any suitable type, e.g. an accelerator pedal adapted to be manipulated by a person driving the vehicle. The step of receiving a torque control signal indicative of a demanded engine output torque may be accompanied by determining a value of a demanded engine torque.

Preferably, the clutch can be controlled so as to provide a various degrees of engagements between a full engagement and a complete disengagement. More specifically, the clutch can provide a gradually increasing level of engagement from the complete disengagement towards the full engagement, and vice versa.

Preferably, the step of controlling the clutch so as to be engaged if the received torque control signal indicates that the demanded engine torque is minimal or below a first threshold value and the observed first vehicle operation parameter value is above a second threshold value, involves engaging the clutch fully. Preferably the step of determining whether to control the clutch so as to be re-engaged or disengaged, involves determining whether to control the clutch so as to be re-engaged fully. Preferably, said step involves determining whether to control the clutch so as to be or disengaged completely.

The first vehicle operation parameter could be the vehicle speed or a parameter indicative of the vehicle speed, e.g. a parameter from which the vehicle speed can be determined. For example, the first vehicle operation parameter can be proportional to the vehicle speed, e.g. it can be the rotational speed of an input shaft or a countershaft of a transmission provided functionally between the clutch and the wheels of the vehicle. Where the first vehicle operation parameter is a parameter indicative of the vehicle speed, preferably, the first vehicle operation parameter is directly proportional to the vehicle speed. Preferably, where the first vehicle operation parameter is a parameter indicative of the vehicle speed, the first vehicle operation parameter is indicative of the vehicle speed at least when the clutch is disengaged. It is understood that where the first vehicle operation parameter is the rotational speed of an input shaft or a countershaft of a transmission, of course the vehicle speed can be determined based on said input shaft speed and the current gear ratio provided by the transmission.

In some embodiments, controlling the clutch so as to be engaged is dependent on whether the demanded engine torque is minimal. It is understood that the minimal engine torque is the lowest engine torque in an engine torque interval ranging from a minimal torque to a maximal torque. The minimal engine torque may be zero engine torque.

In some embodiments, controlling the clutch so as to be engaged can be dependent on whether the demanded engine torque is below a first threshold value. Preferably the first threshold value is predetermined. The first threshold value can be higher than zero. However, it is preferred that the first threshold value is low enough to give an indication that the torque control device is not manipulated by a driver of the vehicle.

Preferably, the second threshold value of the first vehicle operation parameter is predetermined. It may be chosen to be high enough to give a clear indication that the vehicle is moving, and low enough to provide the damage and injury risk reducing effect of the invention, as discussed below.

Thus, the clutch is controlled so as to be engaged in dependence on the received torque control signal and the observed value of the first vehicle operation parameter. Subsequently the clutch test disengagement is performed, and the behaviour, in response to the test disengagement, of the second vehicle operation parameter is observed. During the clutch test disengagement, the clutch may be semiengaged, which may be sufficient to provide an observable change of the second vehicle operation parameter.

As discussed below, the test disengagement may be repeated, but nevertheless preferably there is no change of the clutch engagement status between the clutch engagement in dependence on the received torque control signal and the observed value of the first vehicle operation parameter, and the first subsequent clutch test disengagement.

The second vehicle operation parameter can be the vehicle speed or a parameter which is indicative of the vehicle speed. As discussed closer below, in some embodiments, the second vehicle operation parameter can be the engine speed, or a parameter which is indicative of the engine speed.

In some embodiments, the second vehicle operation parameter is identical to the first vehicle operation parameter, and in other embodiments, the second vehicle operation parameter is non-identical to the first vehicle operation parameter. Preferably, where the second vehicle operation parameter is a parameter indicative of the vehicle speed, the second vehicle operation parameter is indicative of the vehicle speed at least when the clutch is disengaged. Similarly to the first vehicle operation parameter, the second vehicle operation parameter could be a parameter from which the vehicle speed can be determined. For example, the second vehicle operation parameter can be proportional, e.g. directly proportional, to the vehicle speed.

It is understood that observing a value of the first vehicle operation parameter, and observing the behaviour of the second vehicle operation parameter, can include registering, e.g. in a controller, values of the first and second vehicle operation parameters. Further, such observations may include receiving parameter values from one or more sensors, and/or calculating the parameter values at least partly from signals received from one or more sensors.

The step of observing the behaviour of the second vehicle operation parameter, is preferably done during the test disengagement of the clutch, i.e. while the clutch is at least partly disengaged. The behaviour may include a response or a change of the second vehicle operation parameter, in response to or as a result of the test disengagement.

The determination whether to control the clutch so as to be re-engaged or disengaged, may include determining whether to control the clutch so as to be disengaged fully.

If the received torque control signal indicates that the demanded engine torque is minimal or below a first threshold value and the observed first vehicle operation parameter value is above a second threshold value, this suggests that the vehicle is moving without the accelerator pedal being depressed, which in turn suggests that the driver is not in control of the vehicle. By controlling the clutch so as to be engaged the engine will be connected to the wheels and provide engine braking of the vehicle, and thereby decrease the risk of damage or injury created by the stray vehicle.

In addition, the subsequent test sequence including the clutch test disengagement and the observation of the second vehicle operation parameter behaviour, prevents the vehicle going from the engine brake mode, to a mode where the engine is propelling the vehicle, e.g. due to the fact that the vehicle is has entered a level part or an inclined part of the road. Thus, the invention provides not only for reducing the speed of a stray vehicle in a downhill slope by engine braking, but also for reducing the vehicle speed, based on the test sequence, in a following level road part or an uphill slope, by preventing engine propulsion of the vehicle. Thereby, the risk of damage or injury caused by the stray vehicle is further decreased.

It should be mentioned that it is known per se to provide vehicle speed dependent clutch operation, e.g. for vehicle creeping or coasting modes. For example, US2011136620A1 discloses a fuel saving stop/start system, where during vehicle coasting conditions, the clutch is disengaged to reduce torque from the wheels to the shutdown engine. U.S. Pat. No. 5,928,110 and U.S. Pat. No. 5,062,049 also relate to clutch operation in certain vehicle conditions. However, the invention relates to a problem, not addressed in these known solutions, of reducing damage and injury caused by stray vehicles, and provides for using the clutch control to limit the vehicle speed as opposed to maintaining it. For example, the clutch test disengagement of the invention provides a new and inventive, yet simple and effective way of determining further clutch control to limit the vehicle speed.

Preferably, observing the behaviour of the second vehicle operation parameter comprises observing whether there is a change of the second vehicle operation parameter. Observing whether there is such a change will provide a reliable manner of determining whether the vehicle is in an engine brake mode or an engine propulsion mode. Such an observation could include observing a rate of change, i.e. a time derivative, of the second vehicle operation parameter. For example, the observation could include registering during the clutch test disengagement a first and a second value of the second vehicle operation parameter, where the second value is registered subsequently to the registration of the first value, and determining an approximate second vehicle operation parameter time derivative by dividing the difference between the first and second values with the time interval between the first and second value registrations.

Preferably, observing the behaviour of the second vehicle operation parameter comprises observing whether a change of the second vehicle operation parameter is positive or negative. This provides for determining, by monitoring the second vehicle operation parameter during said clutch test disengagement, whether the net torque from the engine is positive or not. Thereby, an engine propulsion mode may be positively and reliably identified.

Preferably, the second vehicle operation parameter is the vehicle speed or a parameter which is indicative of the vehicle speed, and the step of determining whether to control the clutch so as to be re-engaged or disengaged comprises determining to control the clutch so as to be disengaged if it is observed that the second vehicle operation parameter is decreasing. This provides for a simple strategy of disengaging the wheels from the engine if the vehicle speed drops, and otherwise re-engaging the wheels to the engine the driveline. If it is observed that the second vehicle operation parameter is increasing, or remaining un-changed, it can be determined to control the clutch so as to be re-engaged. The vehicle speed, or a parameter which is indicative of the vehicle speed, provides an indication for the clutch control decision, which is more reliable than certain other vehicle operation parameters, such as engine torque. The accuracy of the engine torque can be poor due to friction, parasitic loads, etc.

In some embodiments, the second vehicle operation parameter is the engine speed or a parameter which is indicative of the engine speed, and the step of determining whether to control the clutch so as to be re-engaged or disengaged comprises determining to control the clutch so as to be disengaged if it is observed that the second vehicle operation parameter is increasing. If it is observed that the second vehicle operation parameter is decreasing, or remaining unchanged, it can be determined to control the clutch so as to be re-engaged. The use of the engine speed, i.e. the rotational speed of the engine, or a parameter which is indicative of the engine speed, provides a beneficial alternative as a basis for the clutch control decision. E.g. where the engine speed decreases, e.g. down to idle, upon the clutch test disengagement, this is an indication that the vehicle is still in an engine brake mode, and the clutch should be reengaged. Where the engine speed increases, e.g. up to idle, upon the clutch test disengagement, this is an indication that the vehicle is propelled by the engine, and the clutch should be fully disengaged. The parameter indicative of the engine speed could be a parameter from which the engine speed can be determined. For example, the second vehicle operation parameter can be proportional, e.g. directly proportional, to the engine speed. Preferably, where the second vehicle operation parameter is a parameter indicative of the engine speed, the second vehicle operation parameter is indicative of the engine speed at least when the clutch is disengaged.

Preferably, the method comprises repeating said steps of performing a test disengagement of the clutch, observing the behaviour of the second vehicle operation parameter, and determining whether to control the clutch so as to be re-engaged or disengaged, until it is determined to control the clutch so as to be disengaged. Thereby, a repeat of the test sequence provides an effective monitoring of the vehicle while it is in the engine brake mode, and the full clutch disengagement can be executed when it is determined that the vehicle has entered the engine propulsion mode. The repeat of the test sequence can be made periodically, e.g. at predetermined time intervals. Thus, smooth periodic semi-disengagements of the clutch can be performed.

Preferably, the method comprises observing the engine speed, wherein said steps of performing a test disengagement of the clutch, observing the behaviour of the second vehicle operation parameter, and determining whether to control the clutch so as to be re-engaged or disengaged, are performed if the engine speed is below a third threshold value. Thereby, the execution of the test sequence is dependent on the engine speed being below the third threshold value. This is beneficial since it makes it un-necessary to perform the test sequence if the engine speed in itself clearly indicates that the vehicle is in an engine brake mode, e.g. if the engine speed is relatively high. The third threshold value of the engine speed is preferably predetermined. The third threshold value may be slightly higher than the engine idle speed. Thus, when the engine speed presents a reduction down to the third threshold value, this can be an indication that the vehicle is about the exit the engine brake mode, and executing the test sequence can be done to confirm this assumption.

Preferably, the test disengagement of the clutch comprises disengaging the clutch according to a ramp function. Thereby, the clutch engagement can be gradually reduced until an observable change of the second vehicle operation parameter appears, which makes it possible to execute the test sequence without disengaging the clutch more than necessary.

BRIEF DESCRIPTION OF THE DRAWINGS

Below embodiments of the invention will be described with reference to the drawings in which.

DETAILED DESCRIPTION

Figure 1:
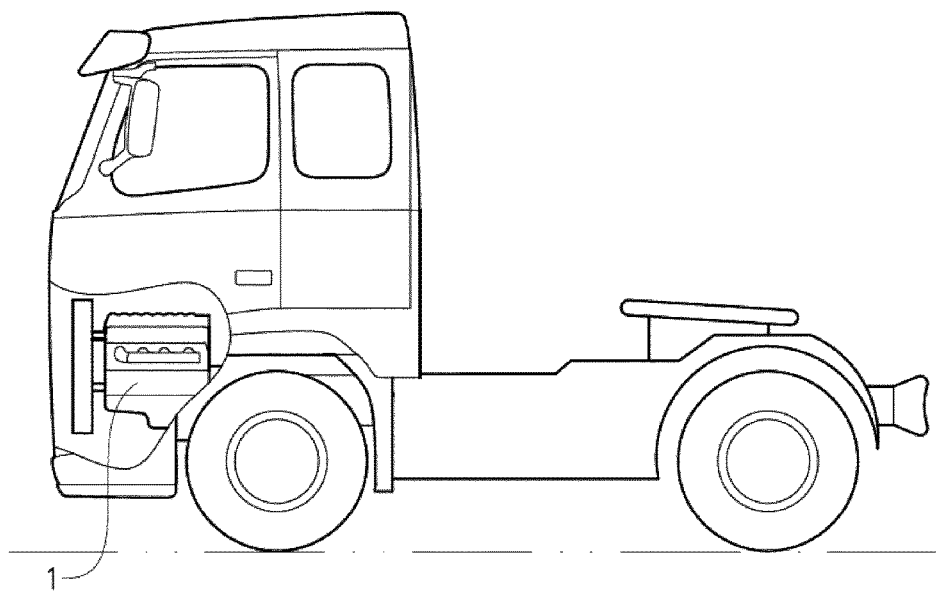
FIG. 1 shows a partially sectioned side view of a vehicle.
Figure 2:
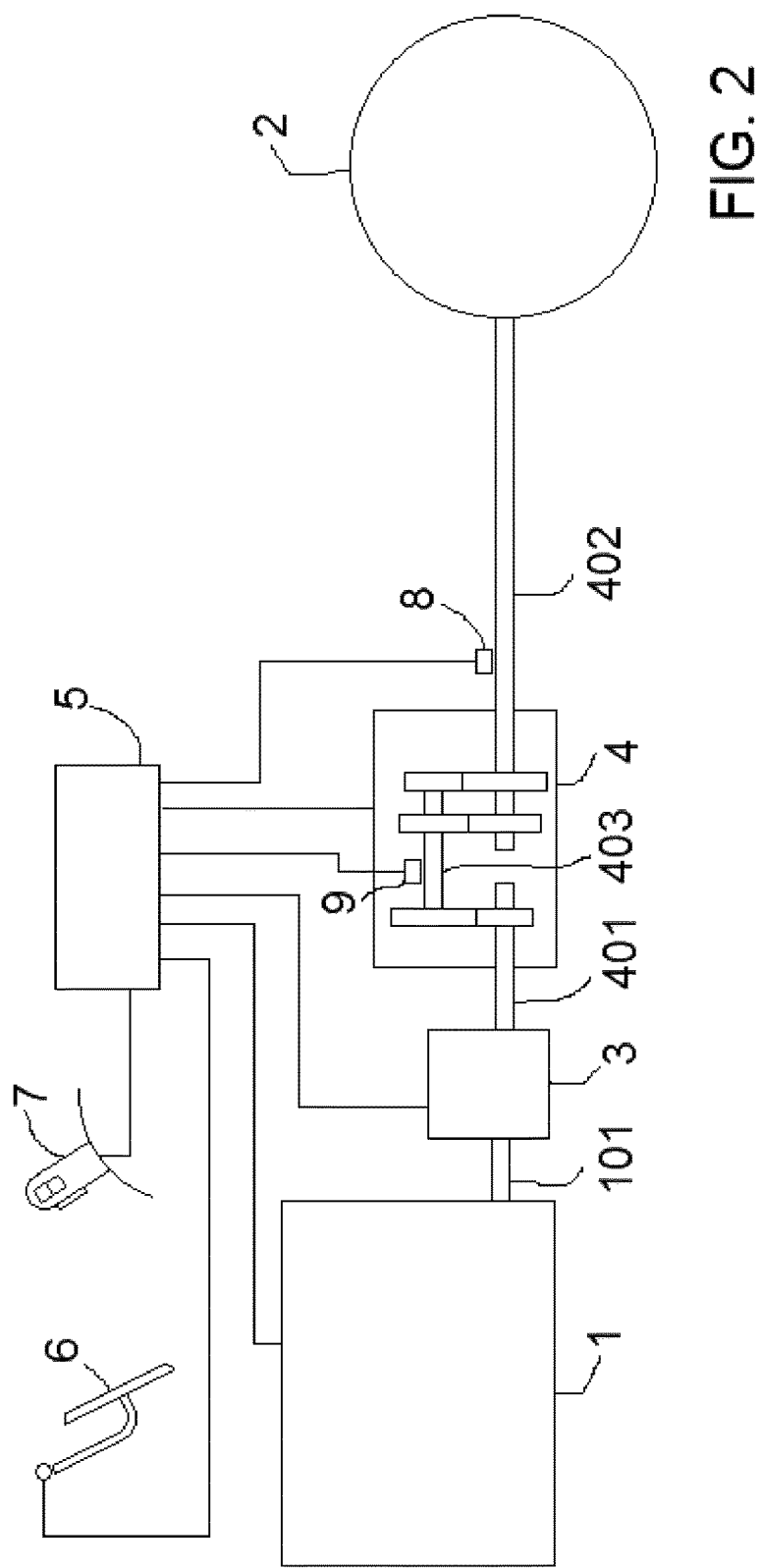
FIG. 2 shows a block diagram of components in the vehicle in FIG. 1.

FIG. 1 shows a vehicle in the form of a truck with an internal combustion engine 1. As can be seen in FIG. 2, the engine 1 is connected to a pair of rear wheels 2 of the vehicle via a clutch 3 and an automated manual transmission 4. More specifically, the transmission 4 is arranged to provide a number of different gear ratios to be selected in dependence on the vehicle operational situation. The clutch 3 is connected to a transmission input shaft 401 and a crankshaft 101 of the engine 1, and the transmission 4 is connected to the rear wheels 2 via a transmission output shaft 402. In the transmission, a countershaft 403 is adapted to connect the input and output shafts 401, 402. The clutch 3 is arranged to for selectively connecting the engine 1 to the rear wheels 2. The clutch 3 can provide a gradually increasing level of engagement from a complete disengagement towards a full engagement, and vice versa.

The vehicle further comprises a controller 5, adapted to carry out steps in methods described below. The controller 5 is adapted to receive torque control signals from a torque control device 6 for controlling the engine output torque. The torque control device 6 is provided in the form of an accelerator pedal controllable by a driver of the vehicle. The controller 5 is adapted to determine, based on the signals from the accelerator pedal 6, values of demanded engine torques.

The controller 5 is also adapted to receive transmission control signals from a transmission control device 7 for controlling the transmission 4. The transmission control device 7 is provided in the form of a gear lever controllable by a driver of the vehicle. Using the transmission control device 7 the driver can select one of four transmission modes, i.e. reverse, neutral, automatic and manual transmission modes.

The controller 5 is further adapted to determine the rotational speed of the engine 1. Also, the controller 5 is adapted to determine a speed of the vehicle. As known per se this is done based on signal from a vehicle speed sensor 8 arranged at the transmission output shaft 402. Alternatively, the vehicle speed can be determined in some other suitable manner, e.g. based on input from a global positioning system (GPS) device. In addition, the controller 5 is adapted to determine a speed of the transmission countershaft 403 by means of a countershaft sensor 9 arranged at the transmission countershaft 403.

The controller 5 is adapted to control the clutch 3 and the transmission 4 at least partly based on data from the transmission control device 7, and values of demanded engine torque, engine speed and vehicle speed.

Figure 3:
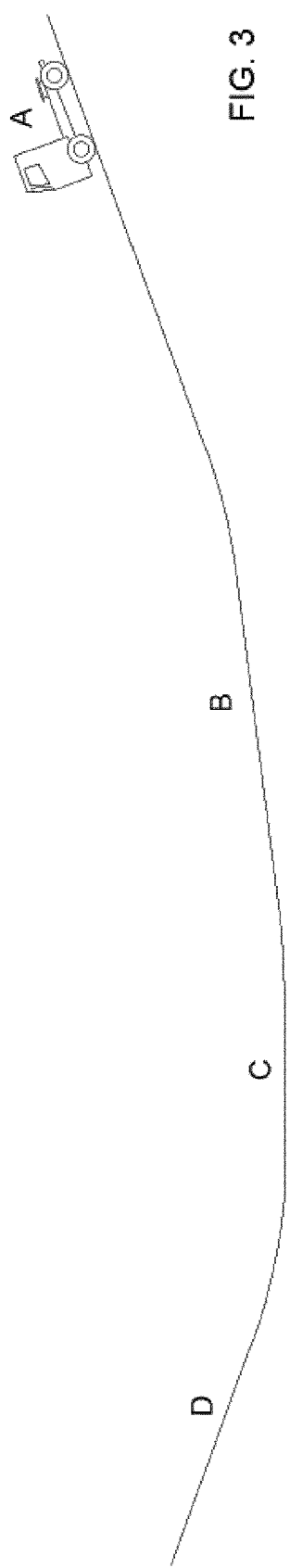
FIG. 3 shows a side view of the vehicle in FIG. 1 on a road with a varying inclination.

With reference to FIG. 3 a vehicle roll-off situation, and a method according to an embodiment of the invention, for decreasing the risk of damage or injury in such a situation, will be described. The vehicle is standing still in a downhill slope of a road, in position A. The engine is running and the transmission control device 7 is in any of the positions for the automatic and manual transmission modes. Further, a parking brake of the vehicle is not activated. The torque control device 6 is not manoeuvred, i.e. zero engine torque is demanded.

The reason for said situation of the vehicle in position A can be for example that the driver has quickly fallen ill and is incapable of controlling the vehicle. Another reason could be that the driver is by negligence not giving the vehicle operation full attention; the driver might even have left the vehicle.

As a result of the downhill slope the vehicle starts moving down the slope. It should be noted that in a typical automatic transmission, or an automated manual transmission, if the vehicle is standing still, and the driver's foot brake pedal is released, the clutch 3 is controlled so as to be partly engaged if the transmission control device 7 is in any of the positions for the automatic and manual transmission modes.

Figure 4:
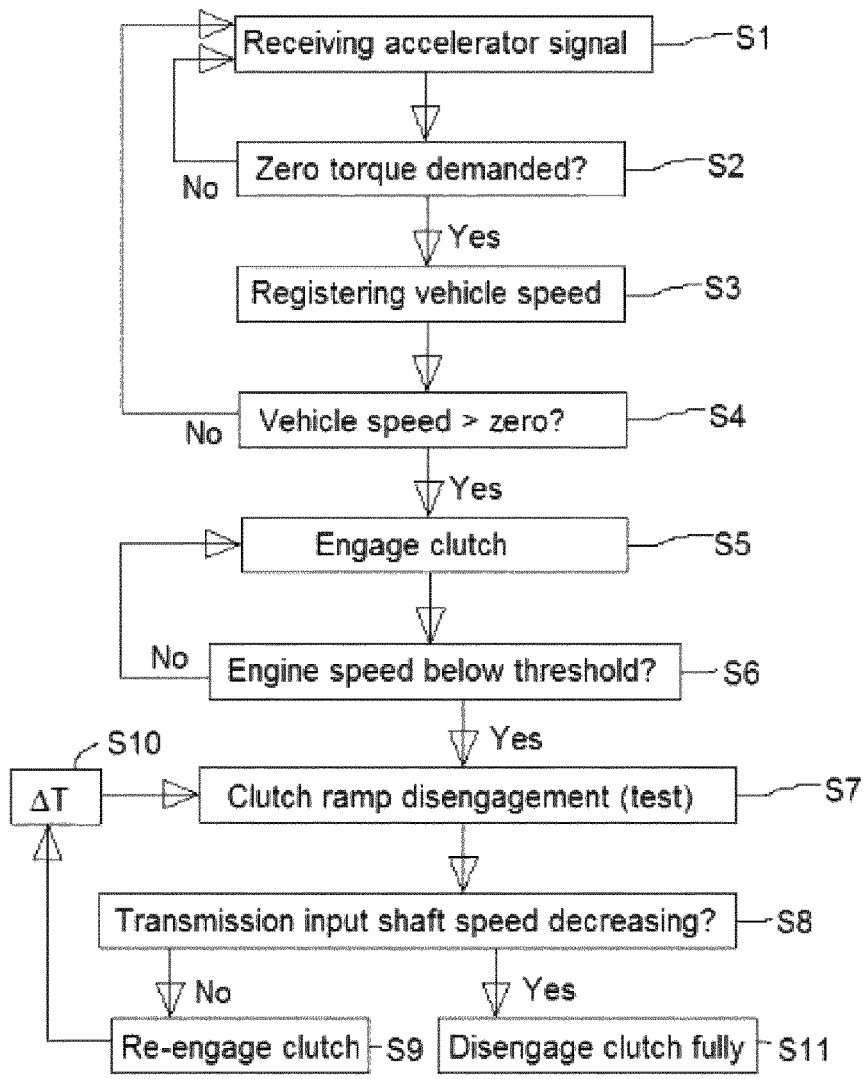
FIG. 4 shows a flowchart of a method for controlling the vehicle in FIG. 1 according to an embodiment of the invention.

Reference is also made to FIG. 2 and FIG. 4. The method according to this embodiment of the invention comprises receiving S1 a torque control signal from the torque control device 6. The controller 5 determines based on the torque control signal a value of the demanded engine torque, and determines S2 whether the demanded engine torque is above zero. If the demanded engine torque is zero, the controller 5 observes S3 a current value of a first vehicle operation parameter, in this example the vehicle speed.

If the vehicle speed is more than zero S4, the controller 5 controls S5 the clutch so as to be fully engaged. This will provide for the speed of the vehicle going downhill to be limited by engine braking, and thereby for decreasing the risk of damage or injury.

Figure 5:
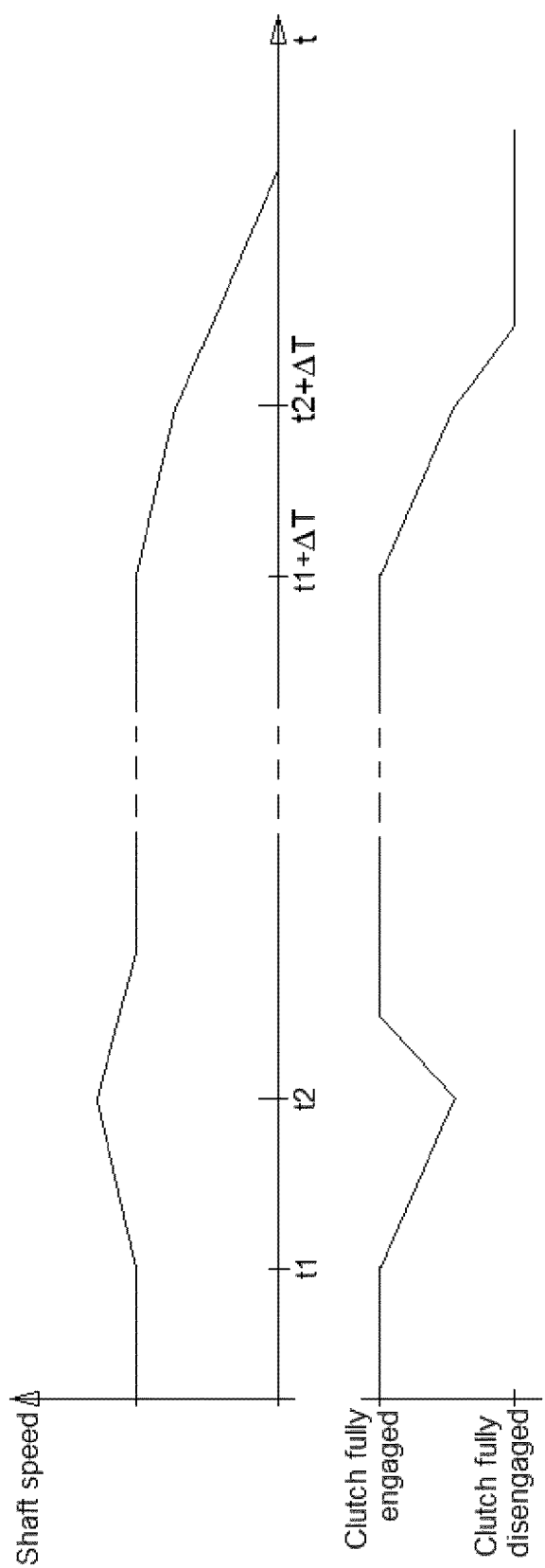
FIG. 5 shows a diagram indicating two conditions of the vehicle during the method depicted in FIG. 4.

After the clutch engagement, the controller 5 monitors the engine speed and compares it to an engine speed threshold value, herein also referred to as a third threshold value. In this example, at the position B in FIG. 3, the vehicle has entered a part of the road where the gradient is lower than at position A. As a result the engine speed decreases at position B. If the controller determines S6 that the engine speed is below the third threshold value, the controller 5 performs a test sequence as follows:

Reference is made also to FIG. 5. The controller 5 controls S7, at the time t1, the clutch 3 so as to provide a test disengagement of the clutch. Thereby the clutch 3 is partly disengaged according to a ramp function. Disengaging the clutch partly according to a ramp function includes gradually decreasing the level of engagement of the clutch 3.

During this partial disengagement the controller observes S8 the behaviour, in response to the test disengagement, of a second vehicle operation parameter, in this example the speed of the transmission countershaft 403. It should be noted that in other embodiments, the second vehicle operation parameter could be some other parameter, e.g. the transmission input shaft speed, or it could be identical to the first vehicle operation parameter, in this example the vehicle speed. The controller observes whether there is, during the clutch test disengagement, a change of the transmission countershaft speed, and whether the change is positive or negative, i.e. whether it goes increases or decreases.

In the example here, it is observed that upon the ramped clutch disengagement starting at the time t1, the transmission countershaft speed increases. Therefore, as indicated in FIG. 5, the clutch is fully engaged again S9 at the time t2. The reason is that an increased countershaft speed, indicative of an increased vehicle speed, during the partial clutch disengagement indicates that the vehicle is still under the effect of engine braking when the clutch is fully engaged. This could be due to the fact that the vehicle is still moving downhill, such at position B in FIG. 3.

Following a predetermined time period ΔT S10, the controller repeats, at the time t1+ΔT, the disengagement S7 of the clutch 3, and observes S8 of the transmission countershaft speed. If the transmission countershaft speed would increase, the clutch would be fully engaged again S9, and the test disengagement and observation would be repeated again after a further time period ΔT S10.

In this example it is observed that the transmission countershaft speed at the clutch test disengagement, initiated at the time t1+ΔT, decreases, and at the time t2+ΔT, the clutch is fully disengaged S11. The reason is that a decreased countershaft speed, indicative of a decreased vehicle speed, during a partial clutch disengagement indicates that the vehicle is being propelled by the engine 1 when the clutch is fully engaged. This could be due to the fact that the vehicle is has entered a level part of the road as in position C in FIG. 3, or an inclined part of the road as in position D in FIG. 3. Thus, by the controller disengaging S11 the clutch 3 of the vehicle fully when the vehicle is being propelled by the engine 1, the vehicle speed is decreased, and the risk of damage or injury caused by the stray vehicle is decreased.

The invention claimed is:

1. A method of controlling a vehicle presenting a plurality of wheels, an engine and a clutch for selectively connecting the engine to a number of the wheels, the method comprising
    receiving a torque control signal indicative of a demanded output torque of the engine, and
    observing a value of a first vehicle operation parameter being the vehicle speed or a parameter which is indicative of the vehicle speed,
    controlling the clutch so as to be engaged if the received torque control signal indicates that the demanded engine torque is minimal or below a first threshold value and the observed first vehicle operation parameter value is above a second threshold value (S4),
    subsequently to the step of controlling the clutch so as to be engaged, performing (S7) a test disengagement of the clutch, comprising at least partly disengaging the clutch, observing a behaviour, in response to the test disengagement, of a second vehicle operation parameter, and
    based at least partly on the observation of the behaviour of the second vehicle operation parameter, determining whether to control the clutch so as to be re-engaged or disengaged.

2. A method according to claim 1, wherein the second vehicle operation parameter is the vehicle speed, a parameter which is indicative of the vehicle speed, the engine speed, or a parameter which is indicative of the engine speed.

3. A method according to claim 1, wherein observing the behaviour of the second vehicle operation parameter comprises observing whether there is a change of the second vehicle operation parameter.

4. A method according to claim 1, wherein observing the behaviour of the second vehicle operation parameter comprises observing whether a change of the second vehicle operation parameter is positive or negative.

5. A method according to claim 1, wherein the second vehicle operation parameter is the vehicle speed or a parameter which is indicative of the vehicle speed, and the step of determining whether to control the clutch so as to be re-engaged or disengaged comprises determining to control the clutch so as to be disengaged if it is observed that the second vehicle operation parameter is decreasing.

6. A method according to claim 1, wherein the second vehicle operation parameter is the vehicle speed or a parameter which is indicative of the vehicle speed, and the step of determining (S9, S11) whether to control the clutch so as to be re-engaged or disengaged comprises determining to control the clutch so as to be re-engaged if it is observed that the second vehicle operation parameter is increasing.

7. A method according to claim 1, wherein the second vehicle operation parameter is the engine speed or a parameter which is indicative of the engine speed, and the step of determining whether to control the clutch so as to be re-engaged or disengaged comprises determining to control the clutch so as to be disengaged if it is observed that the second vehicle operation parameter is increasing.

8. A method according to claim 1, wherein the second vehicle operation parameter is the engine speed or a parameter which is indicative of the engine speed, and the step of determining whether to control the clutch so as to be re-engaged or disengaged comprises determining to control the clutch so as to be re-engaged if it is observed that the second vehicle operation parameter is decreasing.

9. A method according to claim 1, comprising repeating steps of performing (S7) a test disengagement of the clutch, observing the behaviour of the second vehicle operation parameter, and determining whether to control the clutch so as to be re-engaged or disengaged, until it is determined to control the clutch so as to be disengaged.

10. A method according to claim 1, comprising observing the engine speed, wherein steps of performing (S7) a test disengagement of the clutch, observing the behaviour of the second vehicle operation parameter, and determining whether to control the clutch so as to be re-engaged or disengaged, are performed if the engine speed is below a third threshold value.

11. A method according to claim 1, wherein the test disengagement of the clutch comprises disengaging the clutch according to a ramp function.

12. A computer comprising a computer program for performing the steps of claim 1 when program is run on the computer.

13. A non-transitory computer readable medium carrying a computer program for performing the steps of claim 1 when program product is run on a computer.

14. A controller being configured to perform the steps of the method according to claim 1.

15. A vehicle comprising a controller according to claim 14.

* * * * *